US012704796B2

(12) United States Patent
Gurovich et al.

(10) Patent No.: US 12,704,796 B2
(45) Date of Patent: Aug. 11, 2026

(54) ELECTROPHOTOGRAPHIC INK COMPOSITIONS

(71) Applicant: Hewlett-Packard Development Company, L.P., Spring, TX (US)

(72) Inventors: Doron Gurovich, Nes Ziona (IL); Vladislav Kaploun, Nes Ziona (IL); Albert Teishev, Nes Ziona (IL); Emad Masoud, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 518 days.

(21) Appl. No.: 18/039,908

(22) PCT Filed: Dec. 15, 2020

(86) PCT No.: PCT/US2020/065075
§ 371 (c)(1),
(2) Date: Jun. 1, 2023

(87) PCT Pub. No.: WO2022/132132
PCT Pub. Date: Jun. 23, 2022

(65) Prior Publication Data
US 2024/0036490 A1 Feb. 1, 2024

(51) Int. Cl.
*G03G 9/135* (2006.01)
*G03G 9/08* (2006.01)
*G03G 15/10* (2006.01)

(52) U.S. Cl.
CPC ......... *G03G 9/1355* (2013.01); *G03G 9/0804* (2013.01); *G03G 15/10* (2013.01)

(58) Field of Classification Search
CPC ..... G03G 9/1355; G03G 9/0804; G03G 15/10
See application file for complete search history.

(56) References Cited

U.S. PATENT DOCUMENTS

| | | | | |
|---|---|---|---|---|
| 6,406,528 | B1 | 6/2002 | Macholdt et al. | |
| 7,144,671 | B2 | 12/2006 | Qian et al. | |
| 8,936,896 | B2 | 1/2015 | Bar-Haim et al. | |
| 9,785,078 | B2 * | 10/2017 | Grinwald | G03G 9/13 |
| 9,798,259 | B2 | 10/2017 | Kabalnov et al. | |
| 10,274,855 | B2 | 4/2019 | Ron et al. | |
| 10,642,180 | B2 | 5/2020 | Noikas et al. | |
| 2002/0086916 | A1 | 7/2002 | Morrison et al. | |

FOREIGN PATENT DOCUMENTS

| | | | | |
|---|---|---|---|---|
| KR | 10-2006-0034343 A | 4/2006 | | |
| WO | 2012/134457 A1 | 10/2012 | | |
| WO | WO-2017012643 A1 * | 1/2017 | | G03G 9/135 |
| WO | 2017/152963 A1 | 9/2017 | | |

* cited by examiner

*Primary Examiner* — Mark F. Huff
*Assistant Examiner* — Boone Alexander Evans
(74) *Attorney, Agent, or Firm* — Dierker & Kavanaugh, P.C.

(57) ABSTRACT

A method of producing a liquid electrophotographic ink composition includes combining a pigment with a charge director in a carrier liquid to produce a pigment dispersion; and combining a thermoplastic resin with the pigment dispersion to produce a liquid electrophotographic ink composition; wherein the charge director comprises a metal salt of a sulfonic acid. A method of printing the liquid electrophotographic ink composition and a printing set comprising the liquid electrophotographic ink composition are also included.

11 Claims, 7 Drawing Sheets

ELECTROPHOTOGRAPHIC INK COMPOSITIONS

Electrophotographic printing processes can involve creating an image on a photoconductive surface, applying an ink having charged particles to the photoconductive surface, such that they selectively bind to the image, and then transferring the charged particles in the form of the image to a substrate.

The photoconductive surface may be on a cylinder and may be termed a photo imaging plate (PIP). The photoconductive surface is selectively charged with a latent electrophotographic image having image and background areas with different potentials. For example, an electrophotographic ink composition comprising charged toner particles in a carrier liquid can be brought into contact with the selectively charged photoconductive surface. The charged toner particles adhere to the image areas of the latent image while the background areas remain clean. The image is then transferred to a substrate directly or, more commonly, by being first transferred to an intermediate transfer member, which can be a soft swelling blanket, and then to the substrate.

DETAILED DESCRIPTION

Figure 1:
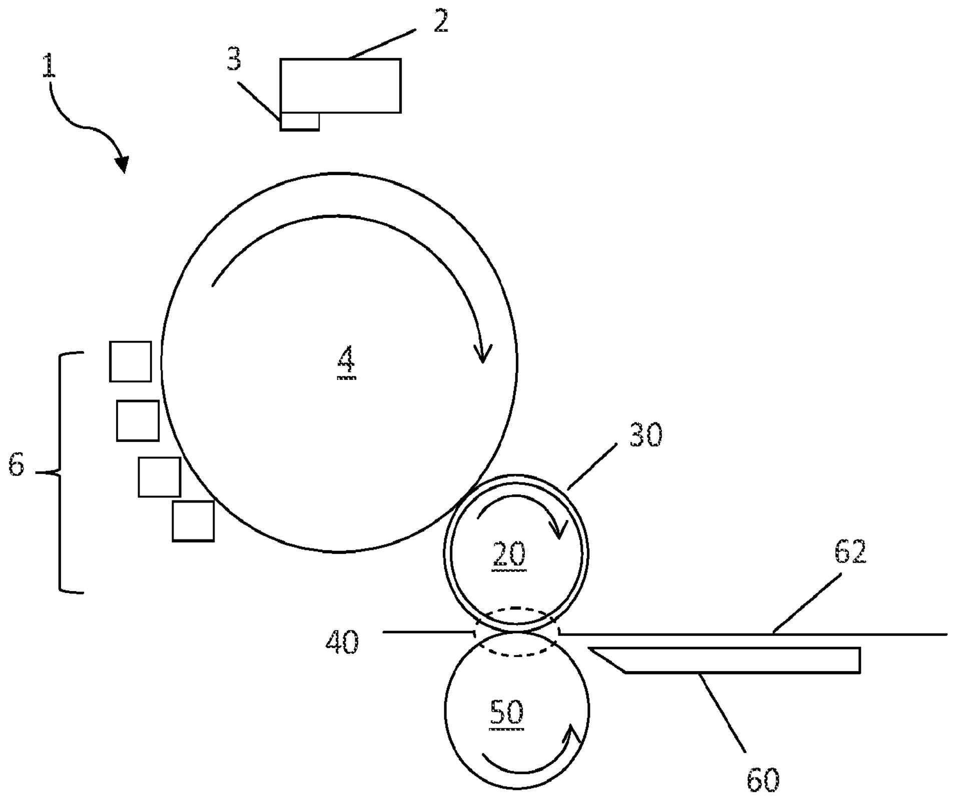
FIG. 1 is a schematic representation of a liquid electrophotographic (LEP) printer.

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, resin, charge directors and other additives can be dispersed to form a liquid electrostatic ink composition or liquid electrophotographic ink composition. The carrier liquids may include a mixture of a variety of different agents, such as surfactants, co-solvents, viscosity modifiers, and/or other possible ingredients.

As used herein, "liquid electrostatic ink composition" or "liquid electrophotographic ink composition" generally refers to an ink composition that is typically suitable for use in an electrostatic printing process, sometimes termed an electrophotographic printing process. It may comprise pigment particles having a thermoplastic resin thereon. The electrostatic ink composition may be a liquid electrostatic ink composition, in which the pigment particles having resin thereon are suspended in a carrier liquid. The pigment particles having resin thereon will typically be charged or capable of developing charge in an electric field, such that they display electrophoretic behaviour. A charge director may be present to impart a charge to the pigment particles having resin thereon.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, unless otherwise stated, "melt flow rate" is measured per ASTM D1238 Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the liquid electrostatic ink composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa·s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate, such as a paper or a plastic substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrostatic printing" is a specific type of electrostatic printing in which a liquid composition is employed in the electrophotographic process rather than a powder toner. An electrostatic printing process may involve subjecting the electrostatic composition to an electric field, for example, an electric field having a field gradient of 50-400 V/μm, or more, in some examples, 600-900V/μm, or more.

As used herein, "NVS" is an abbreviation of the term "non-volatile solids".

As used herein, "overbased" is used to indicate that a stoichiometric excess of the metal is present relative to the amount of anion of the salt.

As used herein, a component "consisting essentially of" a particular constituent or group of constituents may be used to mean that the component comprises mainly those constituents but can comprise other components as long as the other components do not materially affect the characteristics of the invention. In some examples, a component consists essentially of a particular constituent if it is 95 wt. % or more, for example, 99 wt. % or more that constituent.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not just the explicitly recited values of about 1 wt. % to about 5 wt. %, but also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless otherwise stated, wt. % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect, there is provided a method of producing a liquid electrophotographic ink composition. The method of producing a liquid electrophotographic ink composition may comprise:

- combining a pigment with a charge director in a carrier liquid to produce a pigment dispersion; and
- combining a thermoplastic resin with the pigment dispersion to produce a liquid electrophotographic ink composition;
- wherein the charge director comprises a metal salt of a sulfonic acid.

In another aspect, there is provided a method of liquid electrophotographic printing. The method of liquid electrophotographic printing may comprise:

- combining a charging composition with a liquid electrophotographic ink composition to form a print ready liquid electrophotographic ink composition; and
- liquid electrophotographically printing the print ready liquid electrophotographic ink composition;
- wherein the charging composition may comprise:
  - a lecithin;
  - a sulfonic acid amine salt; and
  - a metal salt of a sulfonic acid; and
- wherein the liquid electrophotographic ink composition comprises:
  - chargeable particles comprising a pigment, a thermoplastic resin and a charge director in a carrier liquid;
  - wherein the charge director consists of a metal salt of a sulfonic acid.

In a further aspect, there is provided a liquid electrophotographic printing set. The liquid electrophotographic printing set may comprise:

- a liquid electrophotographic ink composition comprising:
  - chargeable particles comprising a pigment, a thermoplastic resin and a charge director in a carrier liquid;
  - wherein the charge director consists of a metal salt of a sulfonic acid; and
- a charging composition comprising:
  - a lecithin;
  - a sulfonic acid amine salt; and
  - a metal salt of a sulfonic acid.

Also described herein is a liquid electrophotographic ink composition comprising:

- chargeable particles comprising a pigment, a thermoplastic resin and a charge director in a carrier liquid, wherein the charge director consists of a metal salt of a sulfonic acid, for example, a metal salt of an alkyl sulfonic acid.

Additionally, described herein is a liquid electrophotographic ink composition producible by combining a pigment with a charge director in a carrier liquid to produce a pigment dispersion; and combining a thermoplastic resin with the pigment dispersion to produce a liquid electrophotographic ink composition;

wherein the charge director comprises or consists of a metal salt of a sulfonic acid.

During printing, liquid electrophotographic ink compositions are subjected to an electrostatic field. Over time, the charge on the ink particles changes as a result of this continued exposure to the electrostatic field, resulting in changes in the optical density (OD) of printed images. At constant developer roller voltage, the optical density drops from, for example, 1.45 to 1.15 during low coverage printing (<20% coverage), while during high coverage printing (>40% coverage), the optical density rises from 1.45 to 1.7. This variation in optical density over time results in a reduction in print quality. Moreover, it frequently becomes necessary to dispose of significant quantities of the liquid electrophotographic ink composition because the change in the particle conductivity cannot be reversed and print quality has deteriorated.

Examples of the liquid electrophotographic ink compositions and methods described herein have been found to avoid or at least mitigate at least one of these difficulties. It has been found that the stability of the particle conductivity on the ink particles during printing is improved by pretreating the pigment with a charge director, for example, a metal salt of a sulfonic acid. Additionally, it has been found that this pre-treatment provides ink compositions with a reduced sensitivity to the printing coverage and reduces optical density variation over time, resulting in reduced ink wastage and improved print quality.

Method of Producing a Liquid Electrophotographic Ink Composition

In an aspect, there is provided a method of producing a liquid electrophotographic (LEP) ink composition. The method of producing a liquid electrophotographic ink composition may comprise combining a pigment with a charge director in a carrier liquid to produce a pigment dispersion; and combining a thermoplastic resin with the pigment dispersion to produce a liquid electrophotographic ink composition. In some examples, the charge director may comprise, consist essentially of or consist of a metal salt of a sulfonic acid.

In some examples, combining the pigment with a charge director in a carrier liquid comprises adding a pigment and a charge director to a carrier liquid and mixing. In some examples, combining the pigment with a charge director in a carrier liquid comprises dissolving the charge director in the carrier liquid to form a charge director solution and combining the charge director solution with the pigment to form the pigment dispersion.

In some examples, the pigment is combined with the charge director in a carrier liquid by mixing or grinding. In some examples, the pigment is combined with the charge director in a carrier liquid by grinding. In some examples, the grinding is at a grinding speed of at least about 50 rpm, for example, at least about 100 rpm, at least about 150 rpm, at least about 175 rpm, at least about 200 rpm, at least about 225 rpm or at least about 250 rpm. In some examples, the grinding is at a grinding speed of up to about 600 rpm, for example, up to about 550 rpm, up to about 500 rpm, up to about 450 rpm, up to about 400 rpm, up to about 350 rpm, up to about 300 rpm, or up to about 250 rpm. In some examples, the grinding is at a grinding speed of from about 50 rpm to about 600 rpm, for example, about 100 rpm to about 550 rpm, about 150 rpm to about 500 rpm, about 175 rpm to about 450 rpm, about 200 rpm to about 400 rpm, about 225 rpm to about 350 rpm, about 250 rpm to about 300 rpm.

In some examples, the grinding is performed at a temperature of at least 20° C., for example, at least 25° C., at least 30° C., at least 35° C., at least 40° C., at least 45° C., or at least 50° C. In some examples, the grinding is performed at a temperature of up to for example, up to 45° C., up to 40° C., up to 35° C., up to 30° C., up to 25° C., or up to 50° C. In some examples, the grinding is performed at a temperature of from 20° C. to for example, 25° C. to 45° C., 30° C. to 40° C., 35° C. to 50° C.

In some examples, the grinding is performed for at least 1 hour, for example, at least 1.5 h, at least 2 h, at least 2.5 h, at least 3 h, at least 3.5 h, at least 4 h. In some examples, the grinding is performed for up to 8 h, for example, up to 7.5 h, up to 7 h, up to 6.5 h, up to 6 h, up to 5.5 h, up to 5 h, up to 4.5 h, up to 4 h. In some examples, the grinding is performed for 1 h to 8 h, for example, 1.5 h to 7.5 h, 2 h to 7 h, 2.5 h to 6.5 h, 3 h to 6 h, 3.5 h to 5.5 h, 4 h to 5 h, or 4 h to 4.5 h.

In some examples, the method of producing an LEP ink composition may comprise combining a pigment with a charge director in a first carrier liquid to produce a pigment dispersion; combining a thermoplastic resin with a second carrier liquid to form a thermoplastic resin paste; and combining (e.g., dispersing) the thermoplastic resin paste with the pigment dispersion to produce a liquid electrophotographic ink composition. In some examples, the method of producing an LEP ink composition may comprise combining (e.g., dissolving) the charge director in a first carrier liquid to produce a charge director solution; combining the charge director solution with the pigment to form a pigment dispersion; combining (e.g., dispersing) a thermoplastic resin with a second carrier liquid to form a thermoplastic resin paste; and combining the thermoplastic resin paste with the pigment dispersion to produce an LEP ink composition. In some examples, the first carrier liquid may be the same as or different from the second carrier liquid.

In some examples, the method of producing an LEP ink composition may comprise forming a pigment dispersion; forming a thermoplastic resin paste; and combining the pigment dispersion with the thermoplastic resin paste and a third carrier liquid to produce the LEP ink composition. In some examples, the third carrier liquid may be the same as or different from the first carrier liquid; the same as or different from the second carrier liquid; or the same as or different from both the first carrier liquid and the second carrier liquid. In some examples, the first carrier liquid, the second carrier liquid and the third carrier liquid are the same carrier liquid.

In some examples, the method of producing an LEP ink composition may comprise adding a charge adjuvant to the LEP ink composition. In some examples, the charge adjuvant may be added to the LEP ink composition during or after the thermoplastic resin is combined with the pigment dispersion. In some examples, the charge adjuvant may be added to the thermoplastic resin before, during or after the thermoplastic resin is combined with the liquid carrier to form the thermoplastic resin paste. In some examples, the charge adjuvant is added to the LEP ink composition after the thermoplastic resin paste is combined with the pigment dispersion.

In some examples, combining the thermoplastic resin with the pigment dispersion comprises combining the thermoplastic resin and the charge adjuvant with the pigment dispersion. In some examples, combining the thermoplastic resin with the pigment dispersion comprises combining the thermoplastic resin paste and the charge adjuvant with the pigment dispersion. In some examples, combining the thermoplastic resin with the pigment dispersion comprises combining the thermoplastic resin paste (comprising a thermoplastic resin, a charge adjuvant and a carrier liquid) with the pigment dispersion.

In some examples, the method of producing an LEP ink composition comprises producing a pigment dispersion; producing a thermoplastic resin paste; and combining the thermoplastic resin paste and the pigment dispersion. In some examples, combining the thermoplastic resin paste with the pigment dispersion produces chargeable particles dispersed in a carrier liquid. In some examples, the chargeable particles comprise a pigment, a thermoplastic resin and a charge director.

In some examples, the method of producing an LEP ink composition comprises producing a thermoplastic resin paste. In some examples, the method of producing a thermoplastic resin paste comprises suspending a thermoplastic resin in a carrier liquid. In some examples, the method of producing a thermoplastic resin paste comprises suspending a first thermoplastic resin and a second thermoplastic resin in a carrier liquid. In some examples, the chargeable particles comprise a first thermoplastic resin and a second thermoplastic resin.

In some examples, producing a thermoplastic resin paste comprises dispersing a first thermoplastic resin and a second thermoplastic resin in a carrier liquid. In some examples, the method of producing a thermoplastic resin paste comprises combining a thermoplastic resin (for example, the first thermoplastic resin) with the carrier liquid and subsequently adding the other resin (for example, the second resin). In some examples, the method of producing a thermoplastic resin paste may comprise combining a resin (for example, the first resin) with the carrier liquid to form a paste and subsequently adding the other resin (for example, the second resin). In some examples, the resin and the carrier liquid are combined and heated to an elevated temperature before adding the other resin, which may have also been heated to an elevated temperature. In some examples, the resin and the carrier liquid are combined and heated to a temperature above the melting point of the resin before adding the other resin, which may also have been heated to a temperature above its melting point.

In some examples, the resin and carrier liquid are combined and heated until the resin has melted and/or dissolved in the carrier liquid before adding the other resin. In some examples, adding the other resin to the combined resin and carrier liquid comprises mixing the other resin with the combined resin and carrier liquid.

The melting point of the resin may be determined by differential scanning calorimetry, for example, by using ASTM D3418.

In some examples, the resin and the carrier liquid are combined and heated to a temperature of at least 70° C., for example, at least 80° C., for example, at least 90° C., for example, at least 100° C., for example, at least 110° C., for example, at least 120° C., for example, 130° C., for example, to melt the resin. In some examples, the other resin is heated before being added to the combined resin and carrier liquid. In some examples, the other resin is heated to at least 30° C., in some examples, at least 40° C., in some examples, at least 45° C., in some examples, at least 50° C. before being added to the combined resin and carrier liquid. In some examples, the other resin is heated to 100° C. or less, in some examples, 90° C. or less, in some examples, 80° C. or less, in some examples, 75° C. or less, in some examples, 70° C. or less, in some examples, 60° C. or less before being added to the combined resin and carrier liquid. In some examples, the other resin is heated to reduce the viscosity of the other resin before being added to the first resin and the carrier liquid.

In some examples, the method comprises combining the first resin with the carrier liquid to form a first composition; combining the second resin with the carrier liquid to form a second composition; and subsequently combining the first composition and the second composition to form a thermoplastic resin paste. In some examples, the method comprises combining the first resin with the carrier liquid to form a first paste; combining the second resin with the carrier liquid to form a second paste; and subsequently combining the first paste and the second paste to form a thermoplastic resin paste. In some examples, the first resin and the carrier liquid are combined and heated to an elevated temperature to form a first heated composition; the second resin and the carrier liquid are combined and heated to an elevated temperature to form a second heated composition; and subsequently the first heated composition and the second heated composition are combined. In some examples, the first resin and the carrier liquid are combined and heated to a temperature above the melting point of the first resin to form a first heated composition; the second resin and the carrier liquid are combined and heated to a temperature above the melting point of the second resin to form a second heated composition; and subsequently the first heated composition and the second heated composition are combined. In some examples, the first composition and the second composition are heated to the same temperature, which may be a temperature above the melting temperature of all of the resins.

In some examples, the method of producing thermoplastic resin paste comprises mixing the first resin and the second resin together and then combining the mixture of the resins with the carrier liquid.

In some examples, the first resin and the second resin are combined with the carrier liquid and subsequently heated to an elevated temperature. In some examples, the first resin and the second resin are combined with the carrier liquid and subsequently heated to a temperature above the melting point of at least one, optionally all, of the resins. In some examples, the first resin and the second resin are combined with the carrier liquid and subsequently heated to a temperature of at least 70° C., for example, at least 80° C., for example, at least 90° C., for example, at least 100° C., for example, at least 110° C., for example, at least 120° C., for example, 130° C., for example, to melt at least one, optionally all, of the resins. In some examples, the combined first resin, second resin and carrier liquid are heated until all of the resins have melted and/or dissolved in the carrier liquid.

In some examples, the method of producing a thermoplastic resin paste comprises combining a first resin, a second resin, and a carrier liquid.

Melting and/or dissolving a resin (or resins) in the carrier liquid may result in the carrier fluid appearing clear and homogeneous. In some examples, the resin (or resins) and carrier liquid are heated before, during or after mixing.

In some examples, the resin (or resins) and the carrier liquid are mixed at a mixing rate of 500 rpm or less, for example, 400 rpm or less, for example, 300 rpm or less, for example, 200 rpm or less, for example, 100 rpm or less, for example, 75 rpm or less, for example, 50 rpm. In some examples, mixing may continue until melting and/or dissolution of the resin (or resins) in the carrier liquid is complete.

In some examples, after combining and heating the resins and the carrier liquid, the mixture is cooled to a temperature below the melting point of the resins, for example, to room temperature. In some examples, the thermoplastic resin particles are removed from the carrier liquid and re-dispersed in a new portion of carrier liquid, which may be the same or a different carrier liquid.

In some examples, the method of producing an LEP ink composition comprises adding a pigment dispersion to the combined first resin, second resin and carrier liquid. In some examples, the method of producing an LEP ink composition comprises adding a pigment dispersion to the combined first resin, second resin and carrier liquid to form chargeable particles comprising the resins, a pigment and a charge director. In some examples, the method of producing an LEP ink composition comprises grinding the pigment dispersion and the thermoplastic resin paste in the presence of the carrier liquid to form an LEP ink composition. In some examples, the method of producing an LEP ink composition comprises heating and mixing the pigment dispersion and the thermoplastic resin paste in the presence of the additional carrier liquid to form the LEP ink composition.

In some examples, the method of producing an LEP ink composition comprises adding a charge adjuvant to the combined first resin, second resin and carrier liquid and optionally grinding. In some examples, the method of producing an LEP ink composition comprises adding a charge adjuvant to the combined first resin, second resin, pigment, charge director and carrier liquid (i.e., after combining the thermoplastic resin paste with the pigment dispersion) and optionally grinding.

In some examples, the method of producing an LEP ink composition comprises grinding at a grinding speed of at least 50 rpm. In some examples, the method of producing an LEP ink composition comprises grinding at a grinding speed of up to about 600 rpm. In some examples, the method of producing an LEP ink composition comprises grinding for at least 1 h, in some examples, for at least 2 h. In some examples, the method of producing an LEP ink composition comprises grinding for up to about 12 h. In some examples, the method of producing an LEP ink composition comprises grinding at a temperature of at least about 30° C., for example, at least about for example, at least about 40° C., for example, at least about 50° C. In some examples, the method of producing an LEP ink composition comprises grinding at a temperature of at least about 40° C. for a first time period, in some examples, for at least 1 h, in some examples, for at least 1.5 h and then reducing the temperature to a temperature of at least 30° C., in some examples, at least 35° C. and continuing grinding for at least 5 h, in some examples, at least 9 h, in some examples, at least 10 h.

Method of Producing a Print Ready LEP Ink Composition

In some examples, the print ready LEP ink composition is produced by combining the LEP ink composition with a charging composition. In some examples, the print ready LEP ink composition is produced by adding the charging composition to the LEP ink composition.

In some examples, the print ready LEP ink composition is produced by producing the LEP ink composition by any method described herein and adding the charging composition. In some examples, the charging composition is added to the LEP ink composition on the printing press. In some examples, the charging composition is added to the LEP ink composition less than 12 hours before the print ready LEP ink composition is printed, for example, less than 10 hours before, less than 5 hours before, less than 2 hours before, less than 1 hour before or immediately before the print ready LEP ink composition is printed.

In some examples, the print ready LEP ink composition comprises solids of the charging composition in an amount of up to about 40 mg/g solids of the ink composition, for example, up to about 35 mg/g, up to about 30 mg/g solids of the ink composition. In some examples, the print ready LEP ink composition comprises solids of the charging composition in an amount of at least about 30 mg/g solids of the ink composition, for example, at least about 35 mg/g, at least about 40 mg/g solids of the ink composition. In some examples, the print ready LEP ink composition comprise solids of the charging composition in an amount of from about 30 mg/g solids to about mg/g solids of the ink composition, for example, about 35 mg/g NVS to about 40 mg/g NVS.

Liquid Electrophotographic Ink Composition

In an aspect, there is provided a liquid electrophotographic ink composition. The liquid electrophotographic ink composition may comprise chargeable particles comprising a pigment, a thermoplastic resin and a charge director in a carrier liquid. In some examples, the charge director comprises, consists essentially of or consists of a metal salt of a sulfonic acid. In some examples, the charge director consists of a metal salt of a sulfonic acid.

In some examples, the chargeable particles may be producible by, optionally are produced by, combining a pigment with a charge director in a carrier liquid to produce a pigment dispersion; and combining the pigment dispersion with a thermoplastic resin. In some examples, the chargeable particles may be producible by, optionally are produced by, a method described herein.

In some examples, the liquid electrophotographic ink composition further comprises a charge adjuvant. In some examples, the liquid electrophotographic ink composition comprises chargeable particles comprising a pigment, a thermoplastic resin and a charge director and a charge adjuvant in a carrier liquid. In some examples, the liquid electrophotographic ink composition comprises chargeable particles comprising a pigment, a thermoplastic resin, a charge director and a charge adjuvant in a carrier liquid.

In some examples, the liquid electrophotographic ink composition further comprises other additives.

Charge Director

In some examples, the charge director comprises a metal salt of a sulfonic acid. In some examples, the charge director consists essentially of a metal salt of a sulfonic acid. In some examples, the charge director consists of a metal salt of a sulfonic acid.

In some examples, the metal salt of a sulfonic acid comprises a metal salt of an alkyl sulfonic acid or a metal salt of a sulfosuccinate ester.

In some examples, the charge director comprises a metal salt of an alkyl sulfonic acid. In some examples, the charge director consists essentially of a metal salt of an alkyl sulfonic acid. In some examples, the charge director consists of a metal salt of an alkyl sulfonic acid.

In some examples, the charge director comprises an overbased metal salt of a sulfonic acid, for example, an overbased metal salt of an alkyl sulfonic acid.

In some examples, the metal is selected from calcium, barium, sodium, aluminium and combinations thereof. In some examples, the metal is selected from calcium, barium, sodium and aluminium. In some examples, the metal is barium.

In some examples, the sulfonic acid is selected from C1 to C35 sulfonic acids, for example, C5 to C30 sulfonic acids, C10 to C30 sulfonic acids, C15 to C29 sulfonic acids, C20 to C28 sulfonic acids, C21 to C27 sulfonic acids, C21 to C26 sulfonic acids, C22 to C25 sulfonic acids, C23 to C24 sulfonic acids. In some examples, the sulfonic acid is an alkyl sulfonic acid, for example, an alkyl sulfonic acid selected from C1 to C35 alkyl sulfonic acids, C5 to C30 alkyl sulfonic acids, C10 to C29 alkyl sulfonic acids, C15 to C28 alkyl sulfonic acids, C20 to C27 alkyl sulfonic acids, C21 to C26 alkyl sulfonic acids, C22 to C25 alkyl sulfonic acids, C23 to C24 alkyl sulfonic acids.

In some examples, the charge director is present in an amount of up to about 20 mg/g solids of the liquid electrophotographic ink composition, for example, up to about 19 mg/g solids, up to about 18 mg/g solids, up to about 17 mg/g solids, up to about 16 mg/g solids, up to about 15 mg/g solids of the LEP ink composition. In some examples, the charge director is present in an amount of at least about 1 mg/g solids of the LEP ink composition, for example, at least about 5 mg/g solids, at least about 10 mg/g solids, at least about 11 mg/g solids, at least about 12 mg/g solids, at least about 13 mg/g solids, at least about 14 mg/g solids of the LEP ink composition. In some examples, the charge director is present in an amount of form about 10 mg/g solids to about 20 mg/g solids of the LEP ink composition, for example, about 11 mg/g to about 19 mg/g solids, about 12 mg/g solids to about 18 mg/g solids, about 13 mg/g solids to about 17 mg/g solids, about 14 mg/g solids to about 16 mg/g solids, about 10 mg/g solids to about 15 mg/g solids, about 14 m/g solids to about 15 mg/g solids of the LEP ink composition.

In some examples, the charge director is present in an amount of at least about 50 mg/g of pigment, for example, at least about 60 mg/g pigment, at least about 65 mg/g pigment, at least about 70 mg/g pigment, at least about 80 mg/g pigment, at least about 90 mg/g pigment, at least about 95 mg/g pigment, at least about 100 mg/g pigment, at least about 110 mg/g pigment, at least about 120 mg/g pigment, at least about 130 mg/g pigment, at least about 140 mg/g pigment, at least about 150 mg/g pigment, at least about 160 mg/g pigment, or at least about 170 mg/g pigment. In some examples, the charge director is present in an amount of up to about 170 mg/g of pigment, for example, up to about 160 mg/g pigment, up to about 150 mg/g pigment, up to about 140 mg/g pigment, up to about 130 mg/g pigment, up to about 120 mg/g pigment, up to about 110 mg/g pigment, up to about 100 mg/g pigment, up to about 95 mg/g pigment, up to about 90 mg/g pigment, up to about 80 mg/g pigment, up to about mg/g pigment, up to about 65 mg/g pigment, up to about 60 mg/g pigment, or up to about 50 mg/g pigment. In some examples, the charge director is present in an amount of from about 50 mg/g of pigment to about 170 mg/g of pigment, for example, about 60 mg/g pigment to about 170 mg/g pigment, about 65 mg/g pigment to about 95 mg/g pigment, about 70 mg/g pigment to about 160 mg/g pigment, about 80 mg/g pigment to about 150 mg/g pigment, about 90 mg/g pigment to about 140 mg/g pigment, about 100 mg/g pigment to about 130 mg/g pigment, or about 110 mg/g pigment to about 120 mg/g pigment.

Pigment

The liquid electrophotographic ink composition may include a pigment. In some examples, the chargeable particles comprise a pigment.

As used herein, "pigment" generally includes pigment colorants, magnetic particles, aluminas, silicas, and/or other ceramics or organometallics. Thus, though the present description primarily exemplifies the use of pigment colorants, the term "pigment" can be used more generally to describe not only pigment colorants, but also other pigments such as organometallics, ferrites, ceramics, and so forth. The pigments may include pigments that impart colours, such as black, magenta, cyan, yellow and white, to an ink. In some examples, the pigment may be a single pigment or a mixture of two or more pigments.

In some examples, the colorant is selected from cyan pigments, magenta pigments, yellow pigments, black pigments, white pigments and silver pigments. In some examples, the pigment is selected from cyan pigments, magenta pigments, yellow pigments, black pigments or white pigments. In some examples, the pigment may be selected from cyan pigments, yellow pigments or black pigments. In some examples, the pigment may be selected from cyan pigments.

The pigment can be any pigment compatible with the carrier liquid and useful for liquid electrophotographic printing. For example, the pigment may be present as pigment particles, or may comprise a resin as described herein and a pigment. The pigments can be any of those standardly used in the art. In some examples, the pigment is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW SGT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. If the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment. If the pigment is a silver pigment, the pigment may be an aluminium powder.

If the pigment is a cyan pigment, it may be a copper phthalocyanine pigment.

The pigment may be present in the liquid electrophotographic ink composition in an amount of from 10 wt. % to 80 wt. % of the total amount of resin and pigment, in some examples, 15 wt. % to 80 wt. %, in some examples, 15 wt.

% to 60 wt. %, in some examples, 15 wt. % to 50 wt. %, in some examples, 15 wt. % to 40 wt. %, in some examples, 15 wt. % to 30 wt. %, in some examples, 10 wt. % to 25 wt. %, in some examples, 15 wt. % to 20 wt. % of the total amount of resin and pigments. In some examples, the pigment particle may be present in an electrostatic ink composition in an amount of at least 50 wt. % of the total amount of resin and pigment, for example, at least 55 wt. % of the total amount of resin and pigment.

Thermoplastic Resin

In some examples, the thermoplastic resin may comprise a thermoplastic polymer. The thermoplastic resin may be referred to herein as a resin. In some examples, the thermoplastic resin may comprise a polymer selected from ethylene acrylic acid copolymers; ethylene methacrylic acid copolymers; ethylene vinyl acetate copolymers; copolymers of ethylene (e.g. 80 wt. % to 99.9 wt. %), and alkyl (e.g. C1 to C5) ester of methacrylic or acrylic acid (e.g. 0.1 wt. % to 20 wt. %); copolymers of ethylene (e.g. 80 wt. % to 99.9 wt. %), acrylic or methacrylic acid (e.g. 0.1 wt. % to 20 wt. %) and alkyl (e.g. C1 to C5) ester of methacrylic or acrylic acid (e.g. 0.1 wt. % to 20 wt. %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt. % to 90 wt. %)/methacrylic acid (e.g. 0 wt. % to 20 wt. %)/ethylhexylacrylate (e.g. 10 wt. % to 50 wt. %)); ethylene-acrylate terpolymers: ethylene-acrylic esters-maleic anhydride (MAH) or glycidyl methacrylate (GMA) terpolymers; ethylene-acrylic acid ionomers and combinations thereof.

The thermoplastic resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g, can be measured using standard procedures known in the art, for example, using the procedure described in ASTM D1386.

The thermoplastic resin may comprise a polymer having acidic side groups that has a melt flow rate of less than about 60 g/10 minutes, in some examples about 50 g/10 minutes or less, in some examples about 40 g/10 minutes or less, in some examples g/10 minutes or less, in some examples 20 g/10 minutes or less, in some examples 10 g/10 minutes or less. In some examples, all polymers having acidic side groups and/or ester groups in the particles each individually have a melt flow rate of less than g/10 minutes, 80 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example, as described in ASTM D1238.

The thermoplastic resin may comprise a copolymer of an alkylene monomer and a monomer having acidic side groups. In some examples, the alkylene monomer may be selected from ethylene and propylene. In some examples, the monomer having acidic side groups may be selected from methacrylic acid and acrylic acid. In some examples, the thermoplastic resin may comprise a copolymer of an alkylene monomer and a monomer selected from methacrylic acid and acrylic acid. In some examples, the thermoplastic resin may comprise a copolymer of ethylene and a monomer selected from methacrylic acid and acrylic acid.

In some examples, the polymer having acidic side groups is a copolymer of an alkylene monomer and a monomer selected from acrylic acid and methacrylic acid. In some examples, the thermoplastic resin may comprise a copolymer of an alkylene monomer and a monomer selected from acrylic acid and methacrylic acid.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic side groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt. % to about 25 wt. % of the copolymer, in some examples from 10 wt. % to about 20 wt. % of the copolymer.

The thermoplastic resin may comprise two different polymers having acidic side groups. The two polymers having acidic side groups may have different acidities, which may fall within the ranges mentioned above. The thermoplastic resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise a copolymer of ethylene and acrylic acid and a copolymer of ethylene and methacrylic acid.

The resin may comprise two different polymers having acidic side groups: a first polymer that is a copolymer of ethylene (e.g. 92 to 85 wt. %, in some examples about 89 wt. %) and acrylic or methacrylic acid (e.g. 8 to 15 wt. %, in some examples about 11 wt. %) having a melt flow rate of 80 to 110 g/10 minutes and a second polymer that is a copolymer of ethylene (e.g. about 80 to 92 wt. %, in some examples about 85 wt. %) and acrylic acid (e.g. about 18 to 12 wt. %, in some examples about 15 wt. %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), an example of the second polymer is Nucrel 699 (from DuPont), and an example of the third polymer is AC-5120 (from Honeywell). In some examples, the resin may comprise a first polymer having a melt viscosity of from 15000 poise to 40000 poise, in some examples 20000 poise to 30000 poise, and a second polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 699 (from DuPont), and an example of the second polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers.

The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt. % to about 16 wt. % of the copolymer, in some examples 10 wt. % to 16 wt. % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt. % to about 30 wt. % of the copolymer, in some examples from 14 wt. % to about 20 wt. % of the copolymer, in some examples from 16 wt. % to about 20 wt. % of the copolymer in some examples from 17 wt. % to 19 wt. % of the copolymer.

In an example, the resin constitutes about 5 to 90%, in some examples about 5 to 80% by weight of the total solids of the electrostatic ink composition. In another example, the resin constitutes about 10 to 60% by weight of the total solids of the electrostatic ink composition. In another example, the resin constitutes about 15 to 40% by weight of the total solids of the electrostatic ink composition. In another example, the resin constitutes about 60 to 95% by weight, in some examples, from 65 to 90% by weight, from 65 to 80% by weight of the total solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a copolymer of a monomer having ester side groups and a monomer having acidic side groups. The polymer may be a copolymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a copolymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the copolymer, in some examples 5 to 40% by weight, in some examples 5 to 20% by weight of the copolymer, in some examples 5 to 15% by weight of the copolymer. The second monomer may constitute 1 to 50% by weight of the copolymer, in some examples 5 to 40% by weight of the copolymer, in some examples 5 to 20% by weight of the copolymer, in some examples to 15% by weight of the copolymer. In an example, the first monomer constitutes 5 to 40% by weight of the copolymer, the second monomer constitutes 5 to 40% by weight of the copolymer, and with the third monomer constituting the remaining weight of the copolymer. In an example, the first monomer constitutes 5 to 15% by weight of the copolymer, the second monomer constitutes 5 to 15% by weight of the copolymer, with the third monomer constituting the remaining weight of the copolymer. In an example, the first monomer constitutes 8 to 12% by weight of the copolymer, the second monomer constitutes 8 to 12% by weight of the copolymer, with the third monomer constituting the remaining weight of the copolymer. In an example, the first monomer constitutes about 10% by weight of the copolymer, the second monomer constitutes about 10% by weight of the copolymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aclyn 201, Aclyn 246, Aclyn 285, and Aclyn 295), AC-5120 and AC 580 (sold by Honeywell), and the Lotader family of toners (e.g. Lotader 2210, Lotader, 3430, and Lotader 8200 (sold by Arkema)).

In some examples, the resin may constitute 5% to 99% by weight of the total solids in the LEP ink composition, in some examples 50% to 90% by weight of the total solids of the LEP ink composition, in some examples 65% to 80% by weight of the total solids of the LEP ink composition. In some examples, the LEP ink composition may comprise resin in an amount of from 10% to 50% by weight of the total solids, for example, 15 to 45% by weight, 20% to 40% by weight, 25% to 35% by weight of the total solids.

Charge Adjuvant

In some examples, the LEP ink composition further includes a charge adjuvant. A charge adjuvant may promote charging of the particles when a charge director is present. The method as described herein may involve adding a charge adjuvant at any stage. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), or hydroxy bis(3,5-di-tert-butyl salicylic) aluminate monohydrate. In an example, the charge adjuvant is or includes aluminum di- or tristearate. In some examples, the charge adjuvant is VCA (aluminium stearate and aluminium palmitate, available from Sigma Aldrich).

The charge adjuvant may be present in an amount of about 0.001% to 5% by weight, in some examples about 0.1% to 1% by weight, in some examples about 0.3% to 0.8% by weight of the total solids of the liquid electrostatic ink composition, in some examples, about 1 wt. % to 5 wt. % of the total solids of the liquid electrostatic ink, in some examples about 1 wt. % to 3 wt. % of the total solids of the liquid electrostatic ink composition, in some examples about 1.5 wt. % to 2.5 wt. % of the total solids of the liquid electrostatic ink composition.

The charge adjuvant may be present in an amount of less than 5% by weight of total solids of the liquid electrostatic ink composition, in some examples in an amount of less than 4.5% by weight, in some examples in an amount of less than 4% by weight, in some examples in an amount of less than 3.5% by weight, in some examples in an amount of less than 3% by weight, in some examples in an amount of less than 2.5% by weight, in some examples, in an amount of less than 2% by weight of the total solids of the liquid electrostatic ink composition.

In some examples, the liquid electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a C8 to C26 fatty acid anion, in some examples a C14 to C22 fatty acid anion, in some examples a C16 to C20 fatty acid anion, in some examples a C17, C18 or C19 fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the charge adjuvant comprises, consists essentially of or consists of an aluminium stearate (e.g., aluminium tristearate), aluminium palmitate and combinations thereof. In some examples, the charge adjuvant comprises, consists essentially of or consists of aluminium tristearate and aluminium palmitate.

The charge adjuvant, which may, for example, be or include a salt of a multivalent cation and a fatty acid anion, may be present in an amount of 0.1 wt. % to 5 wt. % of the total solids of the liquid electrostatic ink composition, in some examples in an amount of 0.1 wt. % to 3 wt. % of the total solids of the liquid electrostatic ink composition, in some examples about 1 wt. % to 3 wt. % of the total solids of the liquid electrostatic ink composition, in some examples about 1.5 wt. % to 2.5 wt. % of the total solids of the liquid electrostatic ink composition.

Other Additives

The LEP ink composition may include another additive or a plurality of other additives. The other additive or plurality of other additives may be added at any stage of the method. The other additive or plurality may be selected from a wax, a surfactant, viscosity modifiers, and compatibility additives. The wax may be an incompatible wax. As used herein, "incompatible wax" may refer to a wax that is incompatible with the resin. Specifically, the wax phase separates from the resin phase upon cooling of the resin fused mixture on a print substrate during and after the transfer of the ink film to the print substrate, e.g., from an intermediate transfer member, which may be a heated blanked. In some examples, the LEP ink composition comprises silica, which may be added, for example, to improve the durability of images produced using the LEP ink. The other additives may constitute 10 wt. % or less of the total solids of the LEP ink composition, in some examples, 5 wt. % or less or 3 wt. % or less of the total solids of the LEP ink composition.

Charging Composition

In an aspect, there is provided a charging composition. In some examples, the charging composition comprises a lecithin; a sulfonic acid amine salt; and a metal salt of a sulfonic acid. In some examples, the charging composition comprises a lecithin; a sulfonic acid amine salt; a metal salt of a sulfonic acid; and a carrier liquid.

In some examples, the charging composition is combined with the liquid electrophotographic ink composition to form a print ready liquid electrophotographic ink composition. In some examples, the charging composition is combined with the liquid electrophotographic ink composition on the printing press to form the print ready liquid electrophotographic ink composition. In some examples, the charging composition is combined with the liquid electrophotographic ink composition to form the print ready liquid electrophotographic ink composition less than 2 hours before the print ready liquid electrophotographic ink composition is printed, for example, less than 1 hour, or immediately before the print ready liquid electrophotographic ink composition is printed.

The charging composition may be added in order to increase and/or maintain sufficient charge on the ink particles, which may comprise chargeable particles comprising the charge director, pigment and thermoplastic resin. In some examples, the charging composition comprises lecithins; sulfonic acid amine salts; and metal salts of a sulfonic acid.

In some examples, the charging composition may comprise 70 wt. % to 90 wt. % liquid carrier, for example, 75 wt. % to 85 wt. %, or 75 wt. % to 80 wt. % liquid carrier.

Lecithins

In some examples, the charging composition comprises lecithins. In some examples, a lecithin comprises a phospholipid or a mixture of phospholipids. In some examples, the phospholipids are glycerophospholipids. In some examples, the lecithin is soya lecithin. In some examples, the lecithin comprises phosphatidylcholine, phosphatidylethanolamine, phosphatidylinositol, and mixtures thereof. In some examples, the lecithin comprises, consists essentially of or consists of phosphatidylcholine, phosphatidylethanolamine and phosphatidylinositol.

In some examples, the charging composition comprises 35 wt. % to 40 wt. % lecithin by weight of the solids of the charging composition, for example, 36 wt. % to 38 wt. %, or 36 wt. % to 37 wt. % lecithin by weight of the solids of the charging composition.

Sulfonic Acid Amine Salts

In some examples, the charging composition comprises sulfonic acid amine salts. In some examples, the sulfonic acid amine salt comprises an alkyl sulfonic acid amine salt, an aryl sulfonic acid amine salt, an aralkyl sulfonic acid amine salt, an alkaryl sulfonic acid amine salt or a combination thereof. In some examples, the sulfonic acid amine salt comprises an alkaryl sulfonic acid amine salt.

In some examples, the sulfonic acid amine salt comprises a sulfonic acid alkyl amine salt, for example, an alkyl sulfonic acid alkyl amine salt, an aryl sulfonic acid alkyl amine salt, an aralkyl sulfonic acid amine salt, an alkaryl sulfonic acid amine salt or a combination thereof. In some examples, the sulfonic acid amine salt comprises an alkaryl sulfonic acid amine salt.

In some examples, the sulfonic acid amine salt comprises a sulfonic acid alkyl amine salt, for example, a C1 to C10 alkyl amine salt of a sulfonic acid, a C1 to C5 alkyl amine salt of a sulfonic acid, a methylamine salt of a sulfonic acid, an ethylamine salt of a sulfonic acid, a propylamine salt of a sulfonic acid, an isopropylamine salt of a sulfonic acid, a butylamine salt of a sulfonic acid, an isobutylamine salt of a sulfonic acid, a sec-butylamine salt of a sulfonic acid, a tert-butylamine salt of a sulfonic acid. In some examples, the sulfonic acid amine salt comprises an isopropylamine salt of a sulfonic acid. In some examples, the sulfonic acid amine salt comprises an alkaryl sulfonic acid isopropylamine salt.

In some examples, the alkaryl sulfonic acid amine salt comprises a C10 to C25 alkaryl sulfonic acid amine salt, for example, a (C5 to C20 alkyl)(C5 to C20 aryl)sulfonic acid amine salt, a (C5 to C19 alkyl)benzenesulfonic acid amine salt, a (C8 to C19 alkyl)benzenesulfonic acid amine salt, a (C10 to C15 alkyl)benzenesulfonic acid amine salt, a (C12 to C14 alkyl)benzenesulfonic acid amine salt, a dodecylbenzene sulfonic acid amine salt.

In some examples, the sulfonic acid amine salt comprises, consists essentially of or consists of dodecylbenzene sulfonic acid isopropylamine salt.

In some examples, the charging composition comprises about 8 wt. % to about 12 wt. % sulfonic acid amine salt by weight of the solids of the charging composition, for example, about 9 wt. % to about 11 wt. %, about 10 wt. % to about 11 wt. %.

Metal Salts of a Sulfonic Acid

In some examples, the metal salt of a sulfonic acid may be the same or different from the charge director. In some examples, the metal salt of a sulfonic acid may be any metal salt of a sulfonic acid described herein.

In some examples, the metal salt of a sulfonic acid may be a metal salt of an alkylsulfonic acid. In some examples, the metal salt of a sulfonic acid may be a barium salt of a sulfonic acid, for example, a barium salt of an alkylsulfonic acid.

In some examples, the metal salt of a sulfonic acid may be an overbased metal salt of a sulfonic acid.

In some examples, the charging composition comprises from about 50 wt. % to about wt. % metal salt of a sulfonic acid by weight of the solids of the charging composition, for example, about 51 wt. % to about 54 wt. %, about 52 wt. % to about 53 wt. % metal salt of a sulfonic acid by weight of the solids of the charging composition.

Liquid Electrophotographic Printing Set

In an aspect, there is described herein, a liquid electrophotographic printing set. In some examples, the liquid electrophotographic printing set comprises a liquid electrophotographic ink composition and a charging composition. In some examples, the liquid electrophotographic printing set comprises any liquid electrophotographic ink composition described herein; and any charging composition described herein. In some examples, the liquid electrophotographic printing set comprises a liquid electrophotographic ink composition comprising: chargeable particles comprising a pigment, a thermoplastic resin and a charge director in a carrier liquid; wherein the charge director consists of a metal salt of a sulfonic acid; and a charging composition comprising: a lecithin; a sulfonic acid amine salt; and a metal salt of a sulfonic acid.

In some examples, the liquid electrophotographic printing set comprises a liquid electrophotographic ink composition comprising: chargeable particles comprising a pigment, a thermoplastic resin and a charge director in a carrier liquid; wherein the charge director consists of a metal salt of a alkyl sulfonic acid; and a charging composition comprising: a lecithin; a sulfonic acid amine salt; and a metal salt of a sulfonic acid.

In some examples, the liquid electrophotographic printing set comprises a liquid electrophotographic ink composition and a charging composition, wherein the charging composition is added to the liquid electrophotographic printing composition before printing.

Method of Liquid Electrophotographic Printing

In an aspect, there is provided a method of liquid electrophotographic printing. In some examples, the method of liquid electrophotographic printing comprises combining a charging composition with a liquid electrophotographic ink composition to form a print ready liquid electrophotographic ink composition; and liquid electrophotographically printing the print ready liquid electrophotographic ink composition.

In some examples, the method of liquid electrophotographic printing comprises combining a charging composition with a liquid electrophotographic ink composition to form a print ready liquid electrophotographic ink composition; and liquid electrophotographically printing the print ready liquid electrophotographic ink composition; wherein the liquid electrophotographic ink composition comprises any liquid electrophotographic ink composition described herein. In some examples, the method of liquid electrophotographic printing comprises combining a charging composition with a liquid electrophotographic ink composition to form a print ready liquid electrophotographic ink composition; and liquid electrophotographically printing the print ready liquid electrophotographic ink composition; wherein the liquid electrophotographic ink composition comprises any liquid electrophotographic ink composition described herein; and wherein the charging composition comprises any charging composition, for example, any charging composition described herein.

In some examples, the method of liquid electrophotographic printing comprises combining a charging composition with a liquid electrophotographic ink composition to form a print ready liquid electrophotographic ink composition; and liquid electrophotographically printing the print ready liquid electrophotographic ink composition; wherein the charging composition comprises: a lecithin; a sulfonic acid amine salt; and a metal salt of a sulfonic acid; and wherein the liquid electrophotographic ink composition comprises: chargeable particles comprising a pigment, a thermoplastic resin and a charge director in a carrier liquid; wherein the charge director comprises, consists essentially of or consists of a metal salt of a sulfonic acid.

In some examples, the method of liquid electrophotographic printing comprises combining a charging composition with a liquid electrophotographic ink composition to form a print ready liquid electrophotographic ink composition; and liquid electrophotographically printing the print ready liquid electrophotographic ink composition, wherein the liquid electrophotographic ink composition comprises any liquid electrophotographic ink composition is producible by, for example, produced by any method described herein; and optionally wherein the charging composition is any charging composition described herein. In some examples, the method of liquid electrophotographic printing comprises combining a charging composition with a liquid electrophotographic ink composition to form a print ready liquid electrophotographic ink composition; and liquid electrophotographically printing the print ready liquid electrophotographic ink composition, wherein the liquid electrophotographic ink composition is producible by combining a pigment with a charge director in a carrier liquid to produce a pigment dispersion; and combining a thermoplastic resin with the pigment dispersion to produce a liquid electrophotographic ink composition; and optionally, wherein the charging composition is any charging composition described herein.

LEP printing may comprise forming a latent electrostatic image on a surface of a photoimaging plate, contacting a print ready LEP ink composition with the surface such that at least some of the chargeable particles of the print ready LEP ink composition adhere to the surface to form a developed image on the surface, and transferring the developed image to a target substrate, optionally via an intermediate transfer member (ITM).

In some examples, the ITM may be heated. In some examples, the ITM may be heated to a temperature of at least 80° C. In some examples, the ITM may be heated to a temperature of at least 85° C., for example, at least 90° C., at least 95° C., at least 100° C., at least 105° C., at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., at least 185° C., at least 190° C., or at least 195° C. In some examples, the ITM may be heated to a temperature of up to 200° C., for example, up to 195° C., up to 190° C., up to 185° C., up to 180° C., up to 175° C., up to 170° C., up to 165° C., up to 160° C., up to 155° C., up to 150° C., up to 145° C., up to 140° C., up to 135° C., up to 130° C., up to 125° C., up to 120° C., up to 115° C., up to 110° C., up to 105° C., up to 100° C., up to 95° C., up to 90° C., up to 85° C. In some examples, the ITM may be heated to a temperature of from 80° C. to 200° C., for example, 85° C.° C. to 195° C., 90° C. to 190° C., 95° C. to 185° C., 100° C. to 175° C., 105° C. to 170° C., 110° C. to 165° C., 115° C. to 160° C., 120° C. to 155° C., 125° C. to 150° C., 130° C. to 145° C., 135° C. to 140° C. In some examples, the ITM is heated to evaporate at least some of the carrier liquid. In some examples, at least some of the carrier liquid is removed during the electrophoresis that is used to transfer of the chargeable particles from the photoimaging plate to the ITM.

In some examples, the LEP printing is performed by a liquid electrophotographic printer. FIG. 1 shows a schematic illustration of an example of an LEP printing apparatus 1 comprising an intermediate transfer member. An image, including any combination of graphics, text and images, is communicated to the LEP printing apparatus 1. The LEP printing apparatus includes a photo charging unit 2 and a photo-imaging cylinder 4. The image is initially formed on a photoimaging plate (also known as a photoconductive member), in this case in the form of photo-imaging cylinder 4, before being transferred to a release layer 30 of the intermediate transfer member (ITM) 20 which is in the form of a roller (first transfer, T1), and then from the release layer 30 of the ITM 20 to a print substrate 62 (second transfer, T2).

According to an illustrative example, the initial image is formed on rotating a photo-imaging cylinder 4 by a photo charging unit 2. Firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. Print ready liquid electrophotographic ink is then transferred to the photo-imaging cylinder 4 by a binary ink developer (BID) unit 6. The BID unit 6 presents a uniform film of print ready liquid electrophotographic ink to the photo-imaging cylinder 4. The print ready liquid electrophotographic ink contains electrically charged particles which, by virtue of an appropriate potential on the electrostatic image areas, are attracted to the latent electrostatic image on the photo-imaging cylinder 4. The print ready liquid electrophotographic ink does not adhere to the uncharged, non-image areas and forms a developed toner image on the surface of the latent electrostatic image. The photo-imaging cylinder 4 then has a single colour ink image on its surface.

The developed toner image is then transferred from the photo-imaging cylinder 4 to a release layer 30 of an ITM 20 by electrical forces. The image is then dried and fused on the release layer 30 of the ITM 20 before being transferred from the release layer 30 of the ITM 20 to a print substrate 62 disposed on an impression cylinder 50. The process may then be repeated for each of the coloured ink layers to be included in the final image.

The image is transferred from a photo-imaging cylinder 4 to an ITM 20 by virtue of an appropriate potential applied between the photo-imaging cylinder 4 and the ITM 20, such that the charged ink is attracted to the ITM 20.

Between the first and second transfers, the solid content of the developed toner image is increased and the ink is fused on to the ITM 20. For example, the solid content of the developed toner image deposited on the cured silicone release layer 30 after the first transfer is typically around 20%, by the second transfer the solid content of the developed toner image is typically around 80-90%. This drying and fusing is typically achieved by using elevated temperatures and airflow-assisted drying. In some examples, the ITM 20 is heatable.

The print substrate 62 is fed into the printing apparatus by a print substrate feed tray 60 and is disposed on an impression cylinder 50. As the print substrate 62 contacts the ITM 20, the single colour image is transferred to the print substrate 62.

To form a single colour image (such as a black and white image), one pass of the print substrate 62 through the impression cylinder 50 and the ITM 20 completes the image. For a multiple colour image, the print substrate 62 may be retained on the impression cylinder 50 and make multiple contacts with the ITM 20 as it passes through the nip 40. At each contact an additional colour plane may be placed on the print substrate 62.

The LEP printing process may produce a printed substrate. The printed substrate may comprise a print substrate and an LEP ink composition disposed on the print substrate. In some examples, the printed substrate may comprise a primer disposed between the print substrate and the LEP ink composition.

Print Substrate

In some examples, the print substrate may be any suitable substrate. In some examples, the print substrate may be any suitable substrate capable of having an image printed thereon. The print substrate may include a material selected from an organic or inorganic material. The material may include a natural polymeric material, for example, cellulose. The material may include a synthetic polymeric material, for example, a polymer formed from alkylene monomers, including, but not limited to, polyethylene, polypropylene, and co-polymers such as styrene-polybutadiene. The polypropylene may, in some examples, be biaxially oriented polypropylene. The material may include a metal, which may be in sheet form. The metal may be selected from or made from, for instance, aluminium (Al), silver (Ag), tin (Sn), copper (Cu) and mixtures thereof. In an example, the print substrate includes a cellulosic paper. In an example, the cellulosic paper is coated with a polymeric material, for example, a polymer formed from styrene-butadiene resin. In some examples, the cellulosic material has an inorganic material bound to its surface (before printing with ink) with a polymeric material, wherein the inorganic material may be selected from, for example, kaolinite or calcium carbonate. In some examples, the print substrate is a cellulosic substrate such as paper. In some examples, the cellulosic substrate may be a coated cellulosic substrate. In some examples, a primer may be coated onto the print substrate before the electrophotographic ink composition is printed onto the print substrate.

In some examples, the print substrate may be a plastic film. In some examples, the print substrate may be any plastic film capable of having an image printed thereon. The plastic film may include a synthetic polymeric material, for example, a polymer formed from alkylene monomers, including, for example, polyethylene and polypropylene, and co-polymers such as styrene-polybutadiene polymers. The polypropylene may, in some examples, be biaxially orientated polypropylene. In some examples, the plastic film may comprise polyethylene terephthalate.

In some examples, the plastic film is a thin film. In some examples, the plastic film comprises polyethylene (PE), linear low density polyethylene (LLDPE), low density polyethylene (LDPE), medium density polyethylene (MDPE), high density polyethylene (HDPE), polypropylene (PP), cast (cPP) or biaxially oriented polypropylene (BOPP), oriented polyamide (OPA), or polyethylene terephthalate (PET).

In some examples, the print substrate comprises a plurality of layers of material laminated together to form a pre-laminated substrate. In some examples, the print substrate comprises a plurality of layers of material laminated together to form a pre-laminated substrate in which a plastic film forms the surface onto which electrophotographic ink can be applied. In some examples, the print substrate comprises a plurality of layers of film laminated together to form a pre-laminated substrate in which a plastic film forms the surface onto which liquid electrophotographic ink can be applied. In an example, the print substrate may be a plastic film laminated to, adhered to or coated on a cellulosic paper. In some examples, the print substrate comprises a plurality of layers of material selected from polymeric materials (e.g. polymeric materials selected from PE, LLDPE, MDPE, PP, BOPP, PET and OPA), metallic materials (e.g. metallic foils such as aluminium foil, or metallized films such as met-PET, met-BOPP or any other metalized substrate), paper and combinations thereof. In some examples, the print substrate comprises a plurality of layers of film of a plastic material, such as a combination of films selected from PE, LLDPE, MDPE, PP, BOPP, PET and OPA, laminated together to form the pre-laminated substrate. In some examples, the pre-laminated substrate comprises a Paper/Alu/PE, PET/Al/PE, BOPP/met-BOPP or PET/PE laminate.

EXAMPLES

The following illustrates examples of the methods and other aspects described herein. Thus, these Examples should not be considered as limitations of the present disclosure, but are merely in place to teach how to make examples of the present disclosure.

Materials

Resins

Nucrel® 699: a copolymer of ethylene and methacrylic acid, made with nominally 11 wt. % methacrylic acid (available form DuPont).

AC-580: a copolymer of ethylene and acrylic acid with an acrylic acid content of 10 wt. % (available form Honeywell).

AC-5120: a copolymer of ethylene and acrylic acid with an acrylic acid content of 15 wt. % (available from Honeywell).

Carrier Liquid

Isopar L™: an isoparaffinic oil comprising a mixture of C11-C13 isoalkanes (produced by Exxon Mobil™; CAS number 64742-48-9.

Pigment

Primary cyan pigment: Lionol Blue FG-7351 (available from TOYO).

Secondary cyan pigment: Heliogen green D 8730 (available from BASF).

Charge Director

Overbased barium sulfonate (LT): a barium salt of a C21 to C26 alkyl sulfonate (available from Chemtura™)

Charging Composition

Lecithin (KT): natural soy lecithin comprising three major phospholipids: phosphatidylcholine, phosphatidylethanolamine, and phosphatidylinositol.

Sulfonic acid amine salt (GT): dodecylbenzenesulfonic acid isopropylamine salt (available from Croda™).

Metal salt of a sulfonic acid (LT): overbased barium sulfonate, a high molecular weight, oil soluble salt.

Example 1

An Example LEP ink composition was prepared by using a thermoplastic resin mixture consisting of Nucrel 699 and AC-580 (60:40); a cyan pigment (ratio of primary/secondary=18.6:1.4); and VCA (charge adjuvant) in the following amounts.

| Materials | % NVS (excluding charge director) in formulation |
|---|---|
| Paste [%] | 68.5 |
| Total pigment loading [%] | 20.00 |
| VCA [%] | 1.6 |
| Charge Director | 14 mg/g solid |
| NVS in grinding [%] | 23 |

A three step production method was used to produce the LEP ink composition

Step 1: Pigment Pre-Treatment

The charge director (LT) (14 mg/g solids of the LEP ink composition, 78 mg/g pigment) was dissolved in Isopar L (100 mL) and combined with the cyan pigment (18.6:1.4 ratio of the primary and secondary cyan pigments) in a lab grinding tool called attritor S1 containing metal grinding balls, and the mixture was ground for 4 hours (at 20° C. to and 250 rpm) to produce a pigment dispersion at 23 wt. % NVS.

Step 2: Preparation of a Thermoplastic Resin Paste

The two resins (60:40 mixture of Nucrel 699 and AC-580) were combined in Isopar L (31 wt. % NVS) in a double planetary mixer (DPM-2, available from Ross & Son Company), at a mixing speed of 60 rpm and heated to a temperature of 120° C. to 160° C. and mixed for about 3 hours. After that time, the heating was stopped, and mixing was continued until the mixture reached room temperature, producing the thermoplastic resin paste.

Step 3: Grinding

The thermoplastic resin paste, the pigment dispersion (comprising the pre-treated pigment) and the charge adjuvant (see Table above for amounts) were then combined in a ~3 L lined tank of the S1 attritor batch grinding mill (available from Union Process Co., Akron, Ohio) and Isopar L was added to give a 23 wt. % NVS mixture in the attritor. The mixture was ground at 40° C. and 250 rpm for 12 h to form the liquid electrophotographic ink composition. The attritor contained 2300 g of material.

Preparation of the Print Ready Liquid Electrophotographic Ink Composition

The LEP ink composition produced in step 3 was diluted with Isopar L to 2 or 3 wt. % NVS (2 wt. % for printing on Series 3 presses and 3 wt. % for printing on Series 4 presses) and a charging composition (NCD, 35-40 mg/g solids was added to the diluted LEP ink composition to form the print ready LEP ink composition.

The charging composition was NCD (natural charge director), which is a mixture of KT (7 wt. %), LT (10 wt. %) and GT (2 wt. %) with a balance (81 wt. %) Isopar L™.

Reference Example

HP ElectroInk™ 4.5 was used as the reference liquid electrophotographic ink composition. This ink is produced by combining the thermoplastic resin paste produced in step 2 above with Isopar L and a pigment (20 wt. % of a 18.6:1.4 mixture of the main and secondary cyan pigments) and grinding in the presence of VCA (1.6 wt. % of total solids) and NCD (1.5 mg/g solids of a mixture of 10 wt. % LT, 7 wt. % KT and 2 wt. % GT in 81 wt. % Isopar L) in an S1 attritor at 40° C. and 250 rpm for 12 h to form a 23 wt. % NVS liquid electrophotographic ink composition.

Preparation of the Print Ready LEP Ink Composition

EI4.5 was diluted with Isopar L to 2 or 3 wt. % NVS and NCD (about 50 mg/g solids) was added to the diluted LEP ink composition to form the print ready LEP ink composition.

Test Methods

Optical Density

Figure 2:
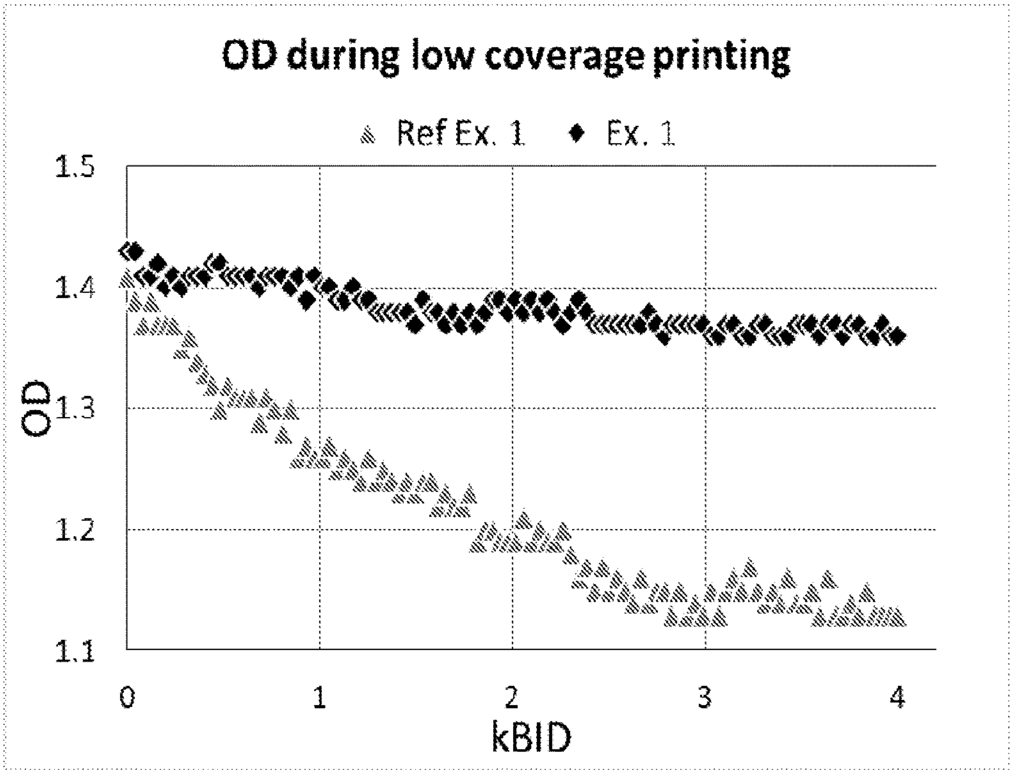
FIG. 2 shows a graph of the optical density of Example and Reference LEP ink compositions against number of prints (in kBID) at low coverage.
Figure 3:
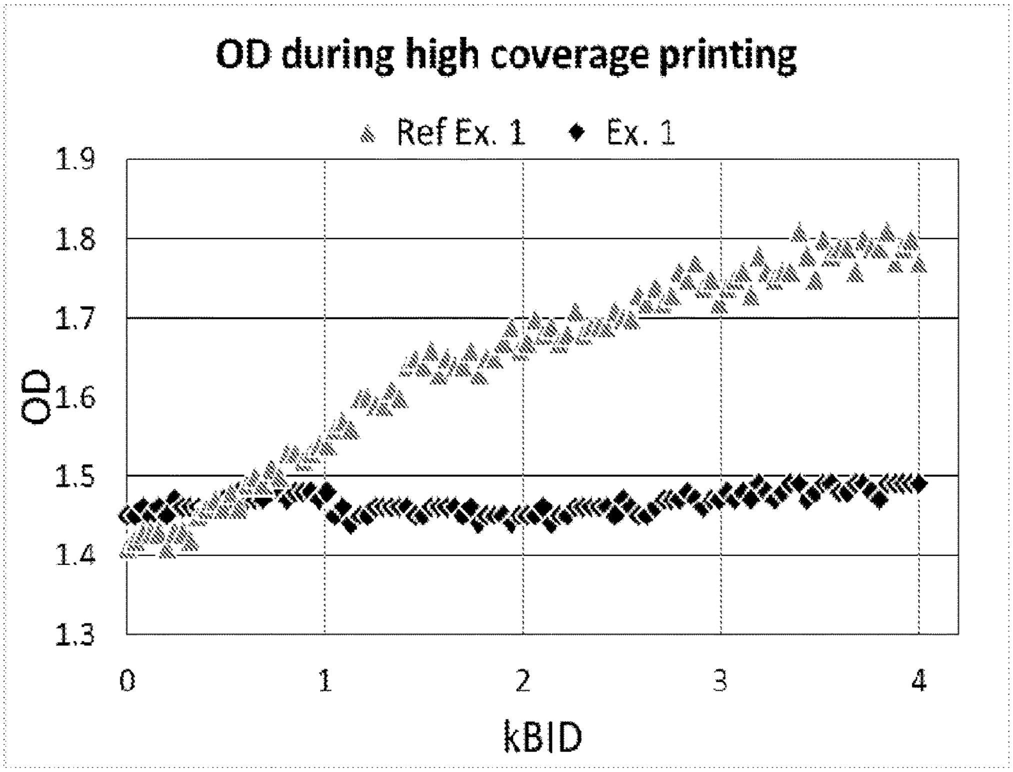
FIG. 3 shows a graph of the optical density of Example and Reference LEP ink compositions against number of prints (in kBID) at high coverage.
Figure 4:
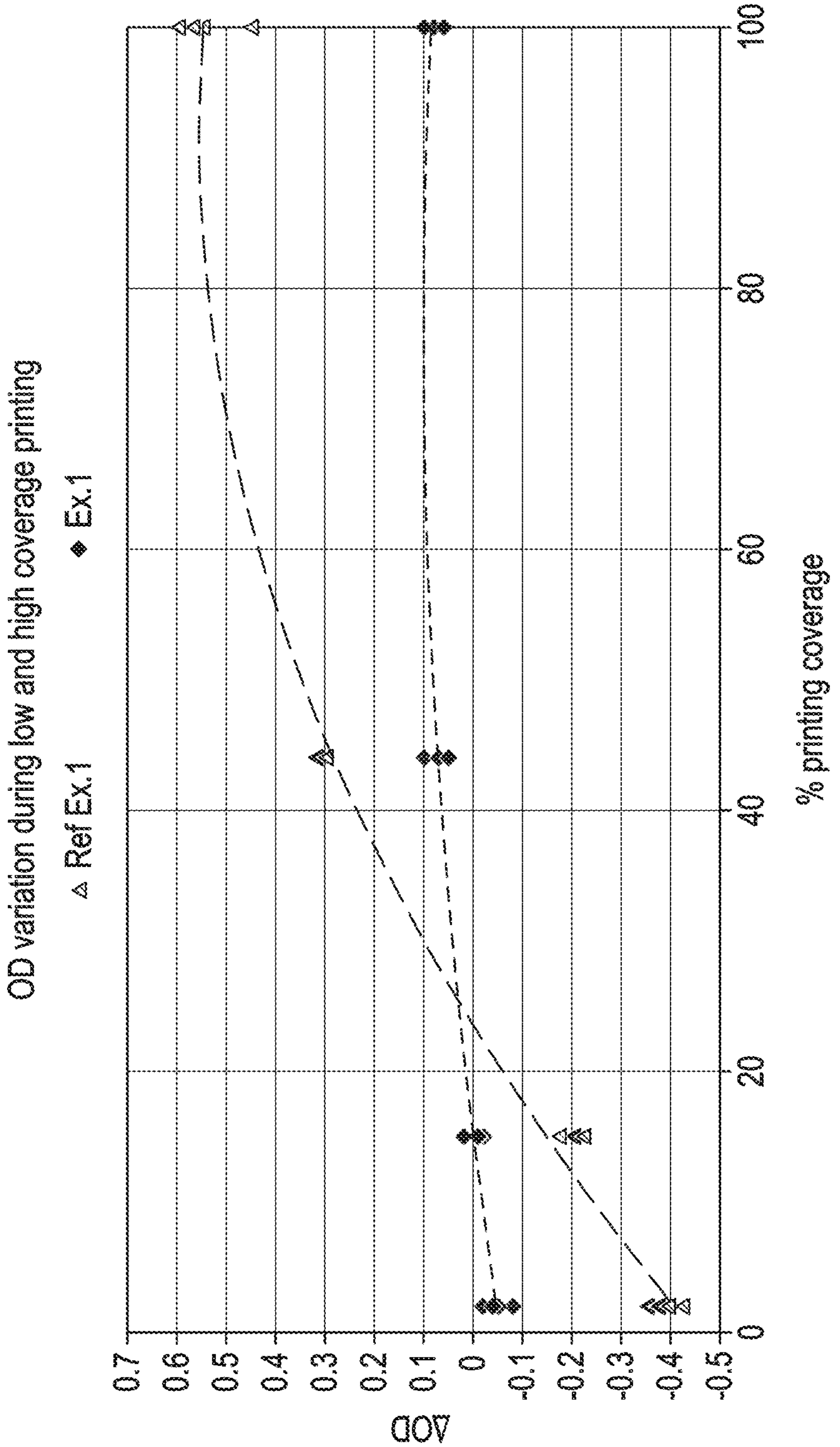
FIG. 4 shows a graph of the change in optical density after 4 kBID of Example and Reference LEP ink compositions against percentage coverage.

The optical density (OD) of the printed LEP ink on a substrate (coated gloss paper: Condat (115 g/m$^2$), EuroArt (130 g/m$^2$); uncoated matte paper: Sappi Mano Natural Tauro (140 g/m$^2$) or coated semimatte paper: Sappi Mango pluss silk (130 gsm)) was measured by using an optical densitometer from X-Rite™, printing each image at a constant developer roller voltage that was determined by using colour calibration during printer aging. An HP Indigo Series 3 LEP printer was used to print the images. To measure the stability of the optical density, 4000 LEP images were printed at various print coverages (2%, 15%, 44% and 100%). The optical density of each image was measured. FIGS. 2 and 3 show the change in optical density over 2000 images (4 kBID, 2 kimp) printed at low (grey-2%) or high (solid-100%) coverage for Example 1 and Reference Example 1 LEP ink compositions. FIG. 4 shows the change in optical density that occurs between image 1 and image 2000 printed at various different coverages. As can be seen from these graphs, the Example 1 LEP ink composition shows reduced variation in optical density over the first 2000 images. Indeed, as can be seen from FIG. 4, the change in optical density.

One method of stabilising the optical density when the particle conductivity changes over time during printing is to change the developer roller voltage to counteract the change in particle conductivity. As can be seen from the data in the table below, pre-treating the pigment with a metal sulfonate reduces the amount that the developer roller voltage is changed in order to counter the change in particle conductivity and reduce the change in optical density.

| | Initial conditions | | Low coverage | | | High coverage | | |
|---|---|---|---|---|---|---|---|---|
| | PC (no NCD) | Initial DRV | (4 kBID; grey, 2%) | | | (4 kBID; solid, 100%) | | |
| | [pmho/cm] | [V] | ΔOD | ΔDRV | ΔPC | ΔOD | ΔDRV | ΔPC |
| Ref. (Q100) | 190 | 410 | −0.45 | 120 | 70 | +0.6 | −193 | −80 |
| Ex. (1S) | 245 | 320 | −0.05 | 20 | <10 | 0.02 | <10 | <10 |
| Ex. (Q6) | 280 | 380 | −0.06 | <20 | <10 | 0 | 0 | <10 |
| Ex. (Q100) | 300 | 420 | −0.08 | 34 | 30 | 0 | 0 | <10 |

DRV = developer roller voltage;

OD = optical density;

PC = particle conductivity;

kBID = 1000 pages printed by the binary ink developer;

1S = ink produced on a small scale using the S1 attritor;

Q6 = a 75 kg batch of ink;

Q100 = a manufacturing scale batch of 1000 kg.

Percentage of Metal Sulfonate Adsorbed on Particle Surface

The percentage of the metal sulfonate in the LEP ink composition and/or in the print ready LEP ink composition that is adsorbed on the particle surface is determined by using HPLC-ESI-MS (on an Agilent Series 6400) at negative ionization.

Figure 5:
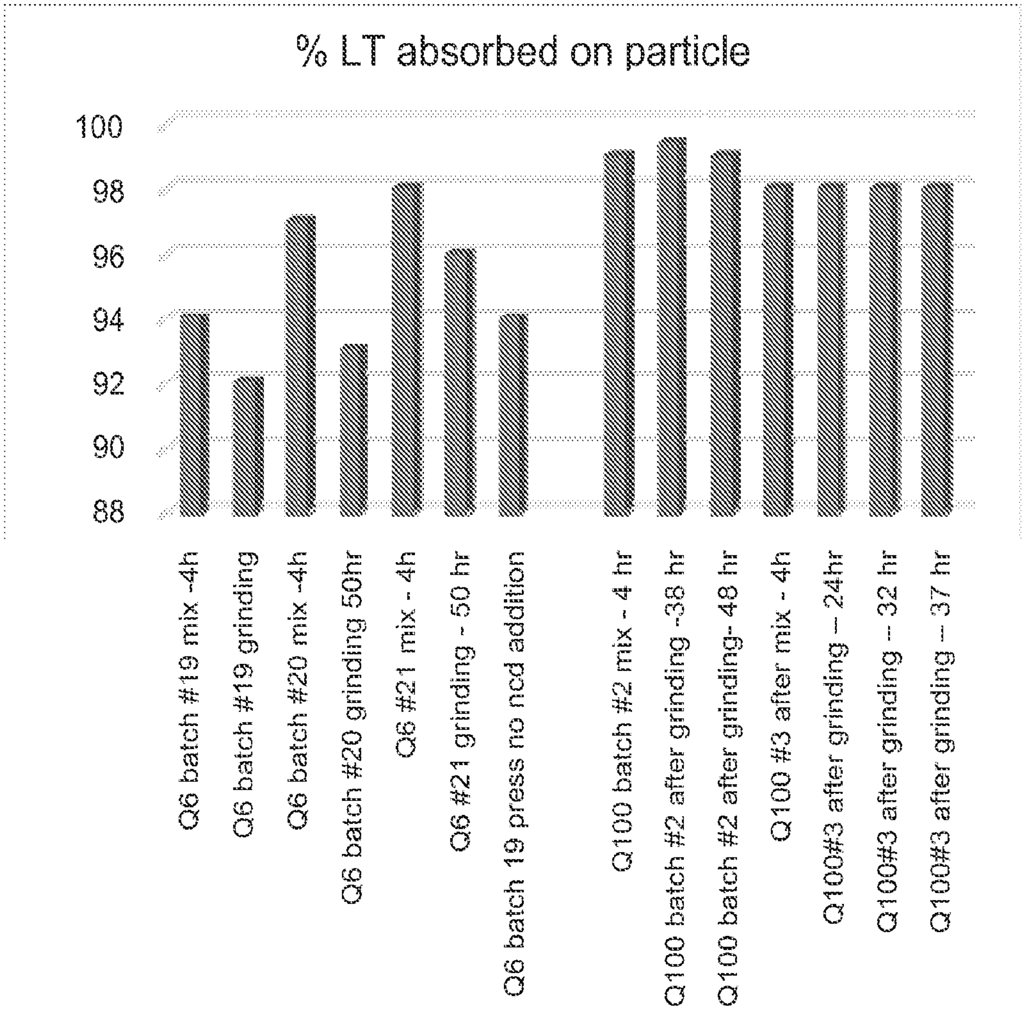
FIG. 5 shows a graph of the percentage of metal sulfonate (LT) adsorbed on the particle surface of Example LEP ink compositions produced in a 50 kg batch (Q6) and a manufacturing scale batch of 1000 kg (Q100).

FIG. 5 is a graph showing the proportion of the metal sulfonate added to the LEP ink composition that is adsorbed on the surface of the chargeable particles. The remaining metal sulfonate is dissolved in the liquid carrier. As can be seen from the graph, a high 20 proportion (about 92% to 99%) of the overbased barium sulfonate (LT) is adsorbed on the chargeable particles when the LEP ink composition is produced by pre-treating the pigment with overbased barium sulfonate (LT). In contrast, a lower percentage of the LT in the Reference ink composition is adsorbed on the surface of the chargeable particles.

Moreover, the adsorption of the metal sulfonate on the chargeable particles is stable, is not impacted by later preparation steps and shows good repeatability between batches and when different manufacturing tools are used.

Particle Conductivity

The particle conductivity was calculated by subtracting the low field conductivity (LFC) from the high field conductivity (HFC), where both LFC and HFC were measured by a miniQoM device while different voltages were applied to the cell (10 V for LFC and 1.5 kV for HFC that measures electrophoretic conductivity at high field; PC=HFC−LFC, measured in pS/cm). The particle conductivity of the print ready LEP ink composition was measured at different concentrations of NCD (mg/g) and during aging printing (4 kBID long).

Figure 6:
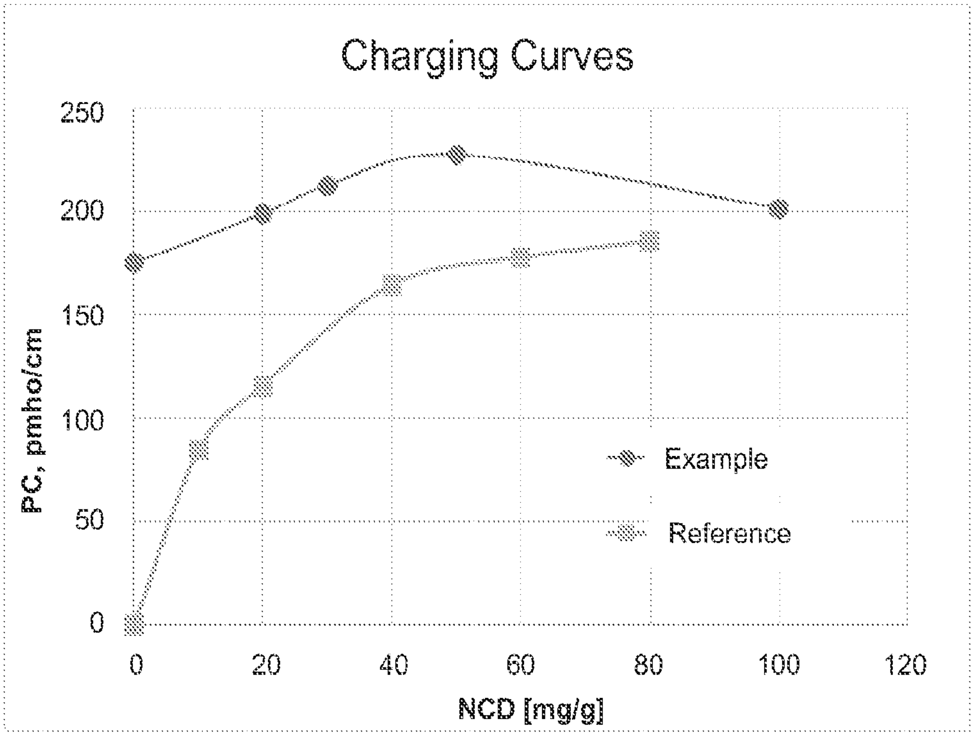
FIG. 6 shows a graph of the particle conductivity for a particular amount of the charging composition (NCD) for Example and Reference LEP ink compositions.

FIG. 6 shows the particle conductivity before addition of the charging composition (NCD) and the particle conductivity with various amounts of charging composition added. As can be seen from the graph, a higher and more stable particle conductivity is achieved by pre-treating the pigment with a metal sulfonate salt than is obtained by adding the charging composition to the already prepared LEP ink composition.

Percentage NCD Components on Solids of the Print Ready LEP Ink Composition

The percentage of a component (e.g., the metal sulfonate, LT) in the LEP ink composition and/or in the print ready LEP ink composition that is adsorbed on the particle surface is determined by using HPLC-ESI-MS (on an Agilent Series 6400) at negative ionization.

Figure 7:
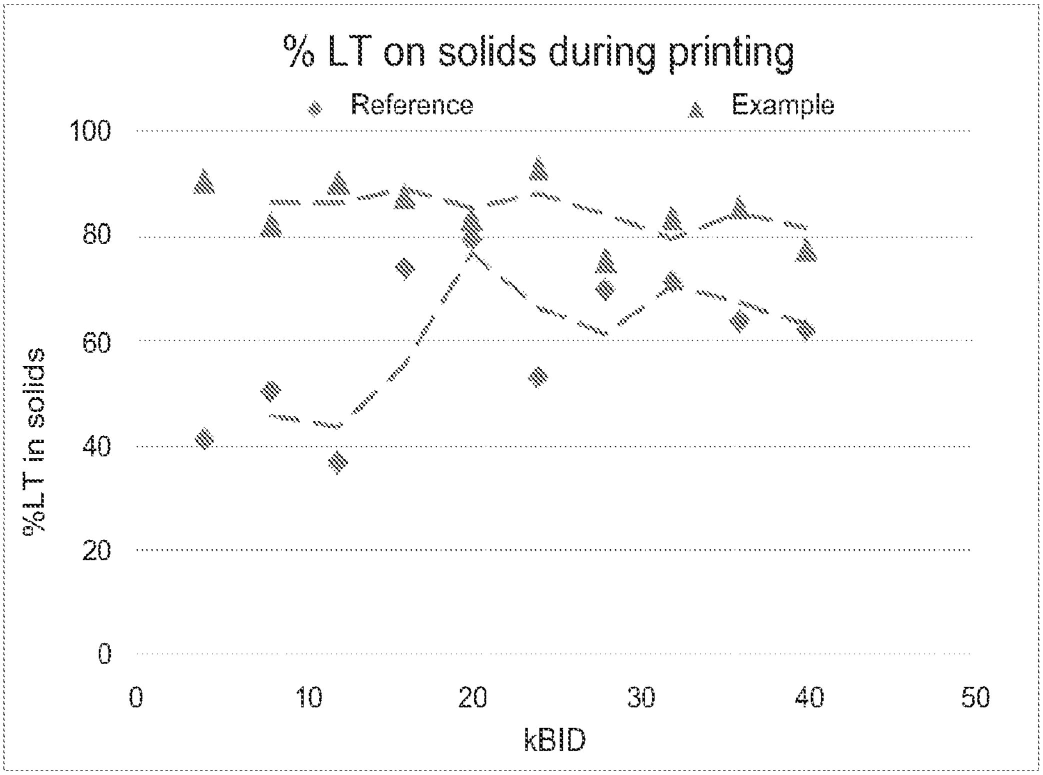
FIG. 7 shows a graph of the proportion of LT on the solids during printing.
Figure 8:
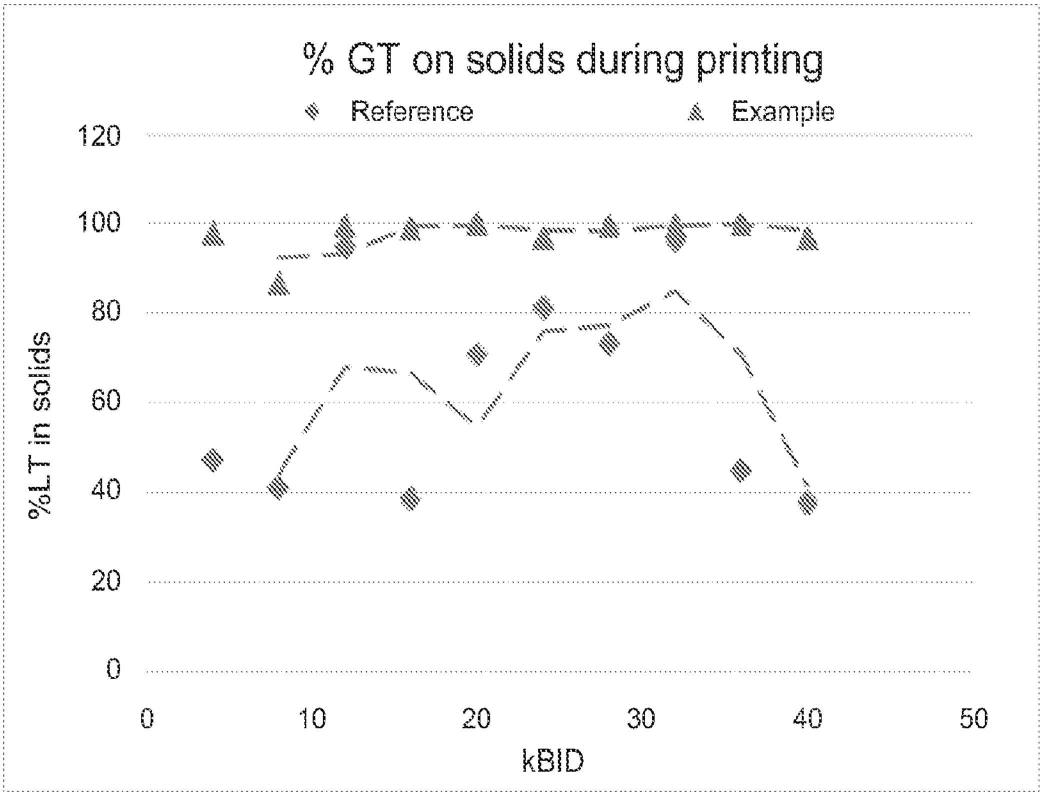
FIG. 8 shows the proportion of GT on the solids during printing.
Figure 9:
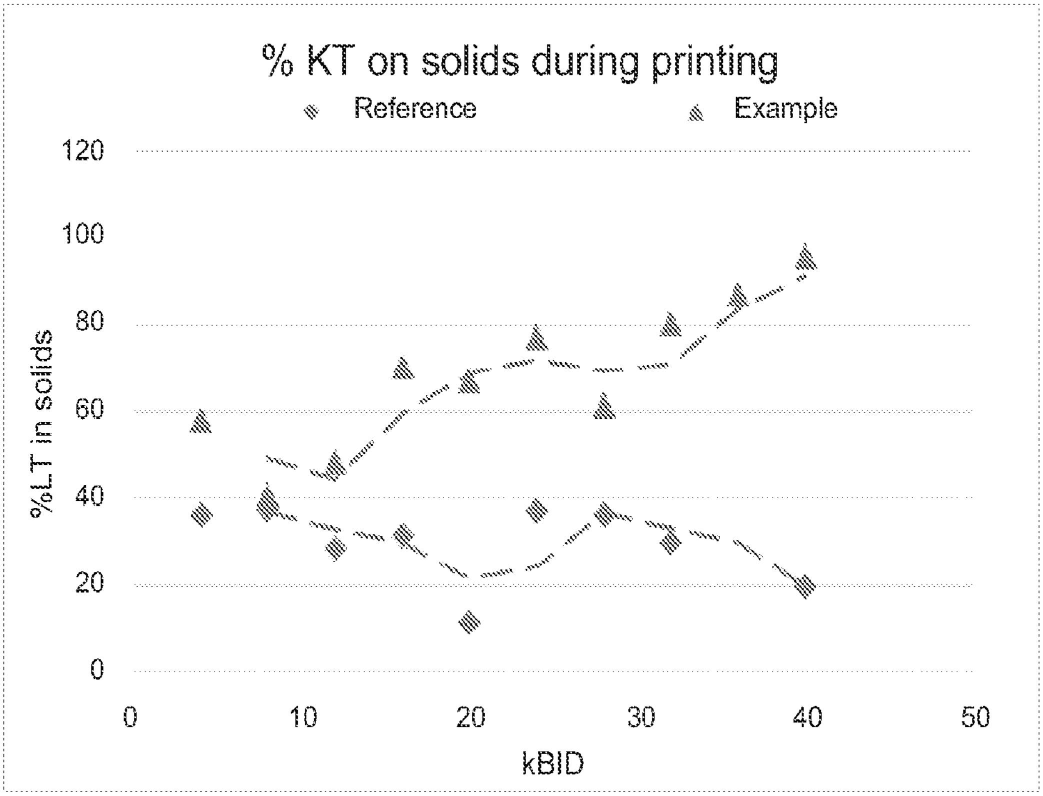
FIG. 9 shows the proportion of KT on the solids during printing.

FIGS. 7, 8 and 9 show the proportion of the components of the charging composition (LT, GT and KT) that forms part of the solids during printing. As can be seen from all three graphs, a greater proportion of each component is adsorbed on the solids when the pigment is pre-treated with a metal sulfonate (Example) than when no pre-treatment is performed (Reference). This higher adsorption of the components of the charging composition on the ink particles changes the ratio of the charging components KT, LT and GT in the liquid ink composition.

OTHER EXAMPLES

Additionally, an LEP ink composition has been produced as described in Example 1 but with Nucrel 699/AC-5120 as the thermoplastic resin. Tests performed using this example LEP ink composition show similar results to Example 1.

Figure 10:
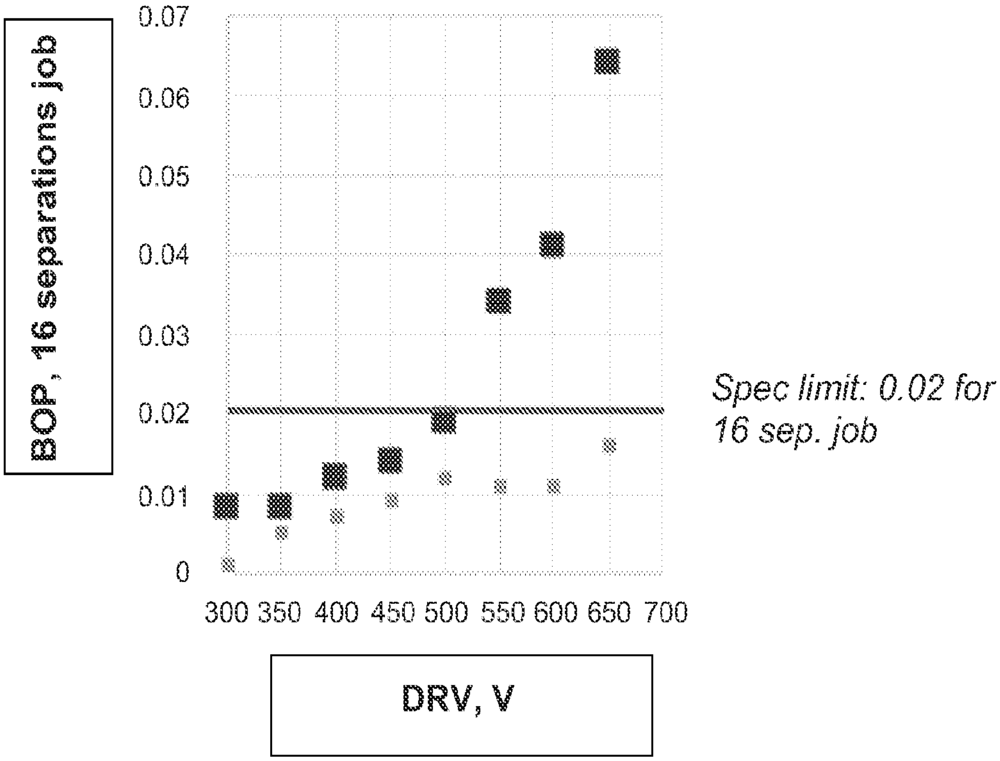
FIG. 10 shows the background on paper (BOP) for black Example and Reference LEP ink compositions at various developer roller voltages (DRV).

Furthermore, yellow and black LEP ink compositions were also produced as described in Example 1 except that a yellow pigment (a mixture of A.T. Incojet Yellow 147003 (available from Rex-ton) and Paliotol Yellow D1819 or Paliotol Gelb D1819 (available from BASF)) or a black pigment (a mixture of Monarch 800 (available from Cabot) and 61DT4209 (available from Flint group/BTC)) was used instead of the cyan pigments. Improved charging stability was also seen for the yellow and black LEP ink compositions. Additionally, for the black LEP ink composition a significant decrease in the sensitivity of the background on paper level to developer roller voltage was seen (FIG. 10).

While the invention has been described with reference to certain examples, those skilled in the art will appreciate that various modifications, changes, omissions, and substitutions can be made without departing from the spirit of the disclosure. It is intended, therefore, that the invention be limited by the scope of the following claims and their equivalents. Unless otherwise stated, the features of any dependent claim can be combined with the features of any of the other dependent claims and any of the independent claims.

The invention claimed is:

1. A method of producing a liquid electrophotographic ink composition, comprising:

combining a pigment with a charge director in a carrier liquid, and grinding the pigment with the charge director to produce a pigment dispersion including a pre-treated pigment therein;

combining a thermoplastic resin with the carrier liquid to produce a thermoplastic resin paste; and combining the thermoplastic resin paste, the pigment dispersion, a charge adjuvant, and the carrier liquid, and grinding the thermoplastic resin paste, the pigment dispersion, and the charge adjuvant to produce a liquid electrophotographic ink composition;

wherein the charge director consists of a metal salt of a sulfonic acid.

2. The method according to claim 1, wherein the pigment dispersion is produced by dissolving the charge director in the carrier liquid to form a charge director solution before combining the pigment with the charge director solution.

3. The method according to claim 1, wherein the sulfonic acid is selected from C1 to C30 alkyl sulfonic acids.

4. The method according to claim 1, wherein a metal of the metal salt is selected from the group consisting of calcium, barium, sodium and aluminium.

5. The method according to claim 1, wherein the charge director is present in an amount of up to 20 mg/g solids of the liquid electrophotographic ink composition.

6. A method of liquid electrophotographic printing, the method comprising:

combining a charging composition with the liquid electrophotographic ink composition produced according to the method of claim 1 to form a print ready liquid electrophotographic ink composition; and liquid electrophotographically printing the print ready liquid electrophotographic ink composition;

wherein the charging composition comprises:

a lecithin;

a sulfonic acid amine salt; and a metal salt of a sulfonic acid.

7. The method according to claim 6, wherein the sulfonic acid is selected from C1 to C30 alkyl sulfonic acids.

8. A liquid electrophotographic printing set, comprising:

the liquid electrophotographic ink composition produced according to the method of claim 1; and a charging composition, comprising:

a lecithin;

a sulfonic acid amine salt; and a metal salt of a sulfonic acid.

9. The liquid electrophotographic printing set according to claim 8, wherein the sulfonic acid is selected from C1 to C30 alkyl sulfonic acids.

10. The method according to claim 1, wherein the charge adjuvant is aluminum di-stearate or aluminum tri-stearate.

11. The method according to claim 1, wherein the charge adjuvant is a combination of aluminum stearate and aluminum palmitate.

* * * * *